United States Patent [19]
Chillingworth

[11] 3,931,794
[45] Jan. 13, 1976

[54] MILKING MACHINES

[75] Inventor: Colin Andrew Chillingworth, Oaklands Park, Australia

[73] Assignees: Joan Mary Perkins; Glyn Andrew Frank Chillingworth, both of Australia

[22] Filed: June 10, 1974

[21] Appl. No.: 477,838

[52] U.S. Cl. .......................... 119/14.08; 119/14.14
[51] Int. Cl.² ..................... A01J 05/04; A01J 07/00
[58] Field of Search ...................... 119/14.08, 14.14

[56] References Cited
UNITED STATES PATENTS

| | | | |
|---|---|---|---|
| 3,556,053 | 1/1971 | Padman et al. | 119/14.08 |
| 3,690,300 | 9/1972 | Tonelli | 119/14.08 |

*Primary Examiner*—Hugh R. Chamblee
*Attorney, Agent, or Firm*—Jay L. Chaskin, Esq.

[57] ABSTRACT

Pressure controlled milk termination means wherein the top of a diaphragm is connected with the milk line by a vacuum communication conduit and the bottom of the diaphragm with the air line, but the bottom of the diaphragm having an air bleed aperture leading thereinto so that there is a constant differential of pressure acting on the diaphragm and of sufficient magnitude to bias the diaphragm upwardly. The diaphragm has coupled to it a valve member which is effective in closing the air bleed aperture, and the arrangement is such that when the air bleed aperture is closed, vacuum is supplied to a cylinder containing a piston which, when it lifts, lifts the claw away from the cow which has just been milked, and at the same time closes the vacuum communication conduit leading from the claw to the milk line.

4 Claims, 3 Drawing Figures

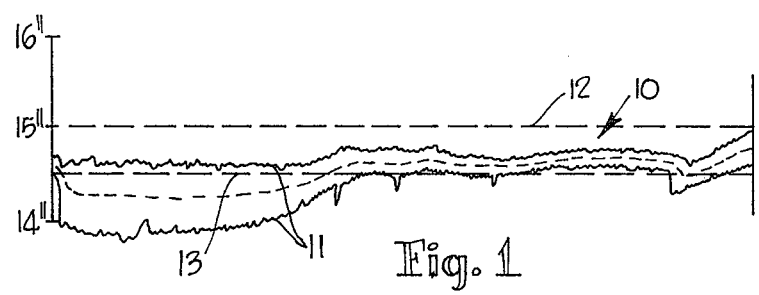
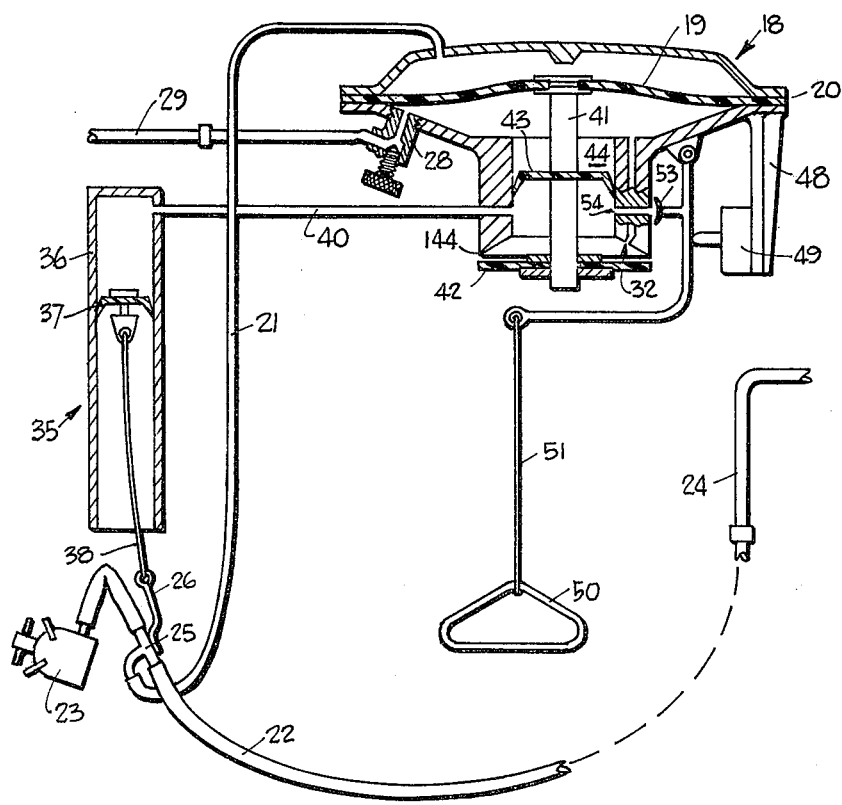

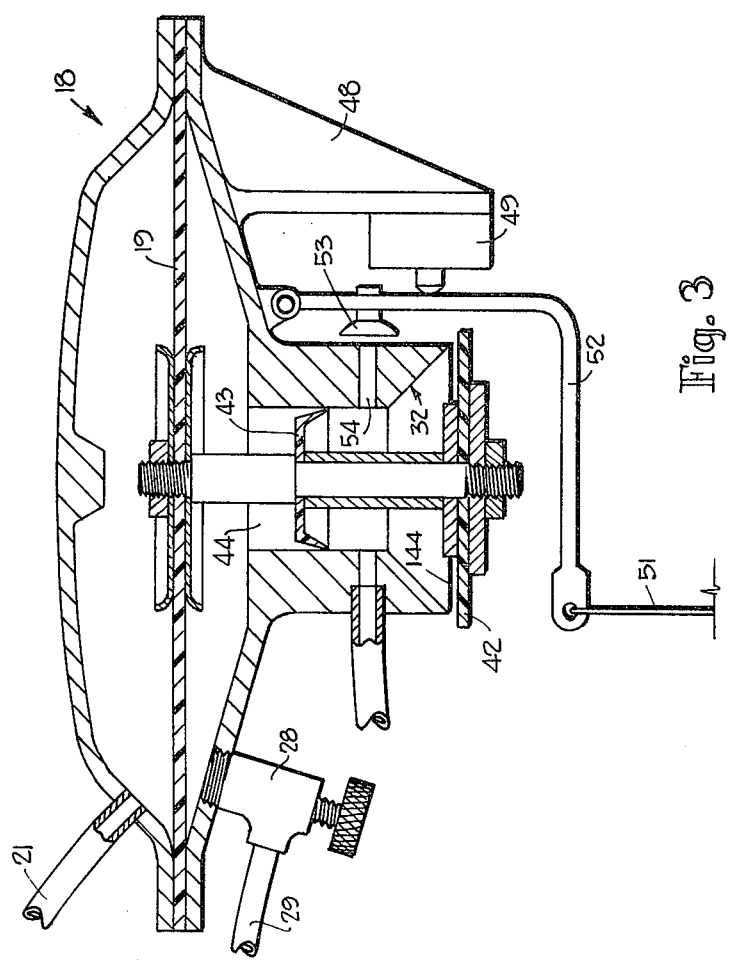

MILKING MACHINES

This invention relates to means for the control of milking termination, and is intended for use in conjunction with a milking machine of the most usual kind, that is a machine having a vacuum pump which is coupled to both a vacuum air line and a vacuum milk line, and wherein a claw is coupled to the milk line by a flexible hose. Such machines are in common use for the milking of dairy cows.

BACKGROUND OF THE INVENTION

One of the difficulties which is encountered in the milking of dairy cows is difficulty of accurately sensing when a machine should be removed from a cow. It has been found that timers are unsatisfactory since a cow might vary from day to day, and the period of time required to finish milking different cows varies widely within a single herd.

Efforts have been made to automatically release the teats of a claw from a cow upon termination of milking, and while these efforts have been successful as far as mechanical removal of the claw is concerned, they have not been completely successful as far as sensing the termination of milking cycle is concerned. For example if a milk flow sensor device is used, unless it is of a very elaborate and expensive electronic type, it is liable to contamination and requires tedious cleaning operations. Furthermore it is subject to failure under certain conditions.

The main object of this invention is to provide milking termination means which is pressure controlled, that is, which responds to the slight decrease in pressure (that is, increase in vacuum) which occurs at the end of milking.

BRIEF SUMMARY OF THE INVENTION

Briefly the invention may be summarised as including a diaphragm, the top of the diaphragm being in communication with the milk line and the bottom of the diaphragm with the air line, but the bottom of the diaphragm having an air bleed aperture leading thereinto so that there is a constant differential of pressure acting on the diaphragm and of sufficient magnitude to bias the diaphragm upwardly. The diaphragm has coupled to it a valve member which is effective in closing the air bleed aperture, and the arrangement is such that when the air bleed aperture is closed, vacuum is supplied to a cylinder containing a piston which, when it lifts, lifts the claw away from the cow which has just been milked, and at the same time closes the vacuum communication conduit leading from the claw to the milk line.

It has been found that by sensing the pressure with a diaphragm of relatively large dimension (preferably about seven inches diameter), the device can be very sensitive to minute variations of pressure, even less than 0.1 inches of mercury, while at the same time the device may have an inbuilt hysteresis which prevents inadvertent actuation upon unexpected peaks of vacuum occurring.

More specifically, the invention consists of pressure controlled milking termination means comprising a diaphragm housing containing a diaphragm sealably secured around its periphery to the housing, a milk line vacuum communication conduit coupled to the milk line and terminating in the housing on one side of the diaphragm, an air line conduit coupled to the air line and terminating in the housing on the other side of the diaphragm, an air bleed aperture opening to atmosphere in air flow communication with said other side of the diaphragm, the aperture being of sufficient dimension to reduce the vacuum effective on said other side, a piston and cylinder assembly, a vacuum conduit extending between the piston and cylinder assembly and the diaphragm housing, and a flexible line depending from the piston coupled to the claw so that actuation of the piston within the cylinder lifts the claw, and a diaphragm operated valve coupled to the diaphragm and operable to place said vacuum conduit into air flow communication with one of the said vacuum lines upon reduction of air pressure on said one side of the diaphragm thereby effecting said actuation of the piston within the cylinder.

BRIEF DESCRIPTION OF THE DRAWINGS

An embodiment of the invention is described hereunder in some detail with reference to and is illustrated in the accompanying drawings in which:

FIG. 1 is a pressure/time diagram illustrating the fluctuation of pressure during a typical milking cycle, FIG. 2 is a diagrammatic representation of the invention and FIG. 3 is an enlarged section of the diaphragm housing, diaphragm and valve arrangement used.

BRIEF DESCRIPTION OF THE PREFERRED EMBODIMENT

In FIG. 1, the ordinate represents inches of vacuum and the abscissa represents time, there being shown a differential of 2 inches of vacuum and a period of about 12 minutes which is an average milking period. The figure designated 10 is a typical graph as plotted by a conventional slow speed recorder showing the pressure existing at the claw, the lines 11 designating the upper and lower excursions of pressure during the milking period. The upper dotted line 12 represents the vacuum drawn by a vacuum pump of a milking machine (not shown) the vacuum being shown as fifteen inches of vacuum. The lower dotted line 13 represents the reference pressure which, as described below, exists on the under side of a diaphragm. It should be noted that the shapes of the graphs 10 vary widely in both degrees of difference of vacuum and in time for different animals, but one characteristic is common to all graphs 10, that at the termination of milking there is a slight increase in vacuum. It is unusual for this increase in vacuum to be less than 0.1 inches of vacuum, and it is usually in the order of 0.3 inches of vacuum. It is this difference in pressure which is utilised in this invention to control the milking termination. It is of course important that milking should be terminated as the pressure drops, since it is believed that much of the veterinary difficulty encountered with cows is due to either over or under milking.

In FIG. 2 there is shown a diagrammatic representation of the milking termination means. A diaphragm housing is designated 18 and contains a diaphragm 19 which is sealably secured within the housing around its periphery 20. A milk line vacuum communication conduit is designated 21, and this connects the housing on the upper side of the diaphragm 19 to a flexible hose 22 coupled to a claw 23 at one end and coupled to a vacuum milk line 24 at the other. The connection is through a T-piece designated 25 to which is attached a lifting loop 26, the T-piece being adjacent the claw 23 and being so arranged that when lifted by the lifting loop 26, the claw 23 kinks the hose 22 as shown in FIG. 2 and thereby terminates any flow of fluid through the hose 22 into the vacuum milk line 24.

The under side of the housing has a needle valve 28 therein and this is coupled to a vacuum air line 29.

An air bleed aperture 32 opens to atmosphere in the bottom of the housing 18, but extends through the housing wall to communicate with the space beneath the diaphragm 19. The air bleed aperture is of such dimension and the needle valve 28 is so adjusted that the difference between the pressures on the upper and lower sides of the diaphragm 19 is about 0.5 inches of vacuum, illustrated by the lines 12 and 13 on FIG. 1.

A piston and cylinder assembly designated generally 35 comprises a cylinder 36 which is mounted vertically and within which a piston 37 is slidable. A flexible line 38 couples the piston 37 to the lifting loop 26, and the arrangement is such that when the piston 37 is actuated to move upwardly within the cylinder 36, the flexible hose 22 is kinked as shown in FIG. 2 and as described above.

A vacuum conduit 40 extends between the cylinder 36 and the housing 18, and is normally in communication with the atmosphere.

The diaphragm 19 has a central stem 41 depending therefrom, the stem 41 terminating at its lower end in a discoid shape valve member 42 which is formed from rubber, and intermediate the ends of the central stem there is disposed a U-cup 43 slidable within a bore 44. When the vacuum slightly increases at the end of the milking period, the diaphragm rises, the valve member 42 seals against the valve seat 144 which is constituted by the lower end of the housing 18, and the air bleed aperture 32 is no longer open to atmosphere. The vacuum air line 29 then draws air from the cylinder 36, through the vacuum conduit 40, and through the air bleed aperture 32, thus reducing the pressure within the cylinder 36 and causing the piston to rise. It will be seen however that a temporary rise in vacuum followed by a return to normal will cause little or no movement in the piston 37, so that the device may be regarded as having in-built hysteresis which is valuable in preventing premature termination of milking.

One of the difficulties encountered with certain herds of cattle is that some cattle have a hiatus after initial milking, but it has been noted that this hiatus seldom if ever exceeds 3 minutes. To prevent termination of milking during the hiatus, the housing 18 is provided with a depending bracket 48 in carrying on its lower end a spring return timer 49 of known type. Many types of timers are available, but in this embodiment the type which is used is a readily available proprietary line wherein a dash-pot or diaphragm member is moved by spring actuation against air pressure. When the handle 50 is pulled downwardly, its cord 51 coupled to the cranked lever 52 lifts a second valve member constituted by a suction cup 53 from a secondary air bleed aperture 54. However after three minutes have elapsed (or whatever other time the timer is set for) the timer urges the cup 53 to seal the aperture 54. It will be clear that if either one of the two apertures 54 or 32 are open to atmosphere, the piston 37 will not be actuated to rise within the cylinder 36.

A series of tests have indicated that a device constructed in accordance with the above embodiment is successful in terminating the milking period of animals having widely different characteristics. It is found that the device requires little maintenance, and is not distressing to the cows since the air bleed conduit existent in the claw 23 quickly allows release of suction of the cups on the cow's teats. Use may be made if desired of a secondary air bleed aperture in the milk line conduit 21, but the aperture will require protection with a short length or sleeve of gauze since it may be easily blocked by insects. However these and other minor variations will be seen to lie within the invention.

I claim:

1. Pressure controlled milking termination means for use in conjunction with a milking machine of the kind having a vacuum pump coupled to both a vacuum air line and a vacuum milk line and a claw coupled to the milk line, by a flexible hose, comprising:

a diaphragm housing containing a diaphram sealably secured around its periphery to the housing, a milk line vacuum communication conduit coupled to the milk line and terminating in the housing on one side of the diaphragm, an air line conduit coupled to the air line and terminating in the housing on the other side of the diaphragm, an air bleed aperture opening to atmosphere and in air flow communication with said other side of the diaphragm, the aperture being of sufficient dimension to reduce the vacuum effective on said other side, a piston and cylinder assembly, a vacuum conduit extending between the cylinder and the diaphragm housing, and a flexible line depending from the piston coupled to the claw so that actuation of the piston within the cylinder lifts the claw, and a diaphragm operated valve coupled to the diaphragm and operable to place said vacuum conduit into air flow communication with one of said vacuum lines upon reduction of air pressure on said one side of the diaphragm thereby effecting said actuation of the piston within the cylinder.

2. Pressure controlled milking termination means according to claim 1 wherein said milk line comprises two lengths of flexible hose one of which is longer than the other, the means further comprising a tubular T-piece interconnecting the milk line vacuum communication conduit and contiguous ends of the flexible hose, the other end of the shorter length of flexible hose engaging an outlet conduit on the claw, and a lifting loop on the T-piece, said flexible line being secured at its lower end to the lifting loop and thereby to said claw through the shorter length of flexible hose, the length of which is such that it kinks upon lifting of the claw by the flexible line, thereby closing the hose.

3. Pressure controlled milking termination means according to claim 1 wherein said diaphragm operated valve comprises a valve member, means coupling the valve member to the diaphragm, and a valve seat on said housing cooperable with said valve member, so constructed and arranged that when the valve is open there is free passage of atmospheric air through the vacuum conduit to said cylinder but upon closure of the valve both said air bleed aperture and said passage are isolated from atmospheric air by the valve member, and the cylinder is placed into air flow communication with the vacuum air line through the air bleed aperture.

4. Pressure controlled milking termination means according to claim 1 further comprising a second air bleed aperture through the housing in air flow communication with the vacuum conduit, a timer secured to the housing, the timer having a plunger projecting therefrom, a second valve member on the lever arm co-operable with a surface of the housing to open or close the second air bleed aperture, so constructed and arranged that, at the commencement of a milking cycle, if the lever arm is rotated about its hinge, it engages and depends the plunger on the timer and also moves the second valve member away from the housing surface to open the second air bleed aperture, but upon release is urged by the timer to again close the second air bleed aperture after a period of time has elapsed but before said first valve member closes.

* * * * *